Jan. 26, 1932.  E. E. DAVIDSON  1,842,587
CHANNELED STRIP MATERIAL
Filed May 14, 1929
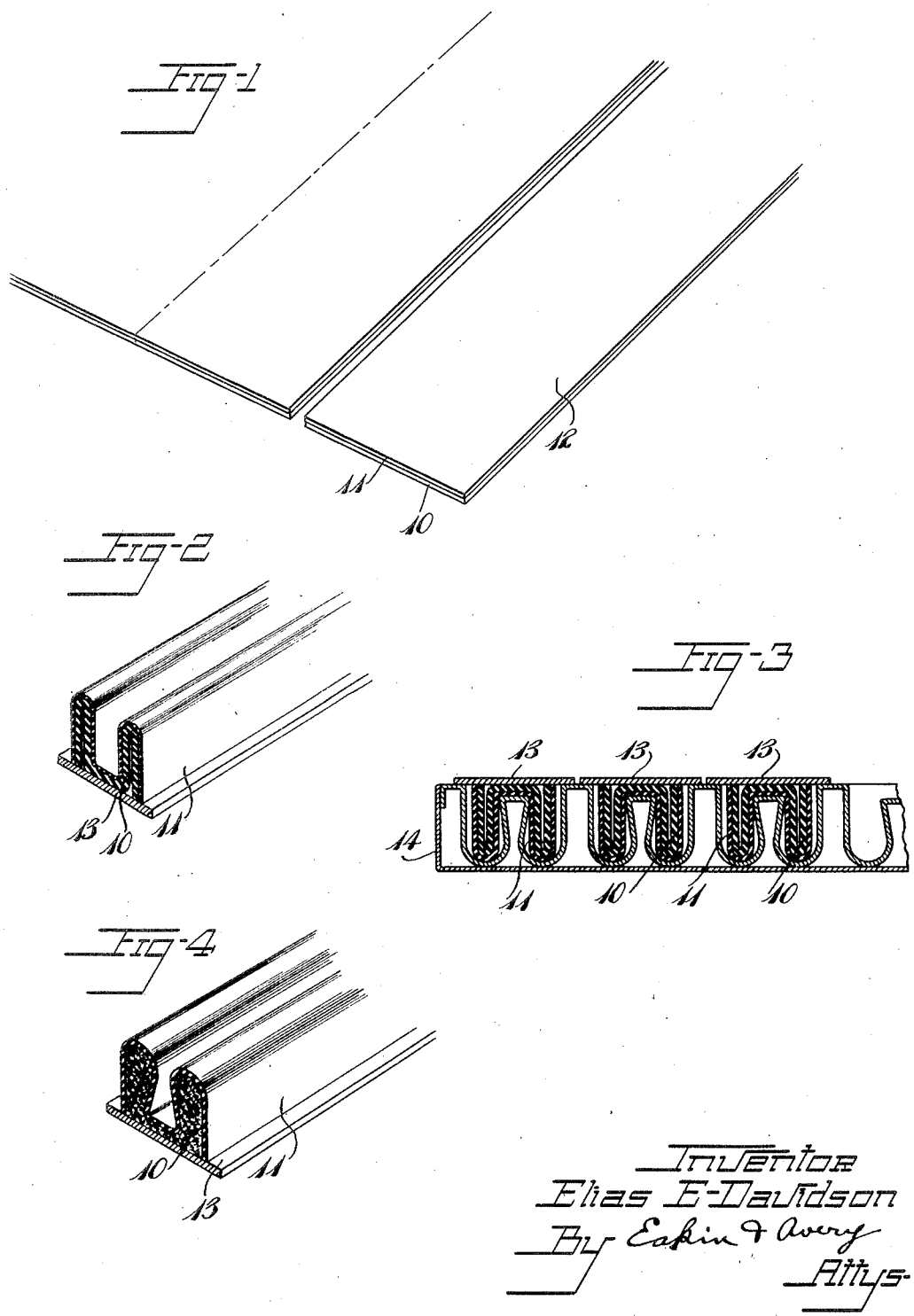
Inventor
Elias E. Davidson
By Eakin & Avery
Attys.

Patented Jan. 26, 1932

1,842,587

UNITED STATES PATENT OFFICE

ELIAS E. DAVIDSON, OF AKRON, OHIO, ASSIGNOR TO THE B. F. GOODRICH COMPANY, OF NEW YORK, N. Y., A CORPORATION OF NEW YORK

CHANNELED STRIP MATERIAL

Application filed May 14, 1929. Serial No. 362,924.

This invention relates to channeled strip material such as is used to guide, cushion and seal the margins of the glass in automobile windows, for example, and to methods of making the same, and its chief objects are to provide economy of manufacture; to provide a channeled strip of neat appearance; to provide a strip adapted for movement of the glass therein without great frictional resistance; and to provide desirable cushioning and sealing properties in the strip.

Of the accompanying drawings:

Fig. 1 is a perspective view of sheet material illustrating an early step in the practice of my invention.

Fig. 2 is a perspective view of the materials illustrating a later step.

Fig. 3 is a vertical section of a mold and the work therein, illustrating a later stage of the operation.

Fig. 4 is a perspective view of the finished strip.

In attaining the above stated objects I produce a channel strip, the side walls of which are in their inner regions composed of soft sponge rubber and in their surface regions are composed of dense, non-cellular rubber of a character such as to give a smooth appearance and lasting properties and preferably so compounded, as by the incorporation of graphite therein, as to permit free sliding of the window glass in the channel although the walls of the channel press with substantial force and seal against the glass.

In my preferred procedure for producing a channel strip as described, a sheet 10 of sponge-rubber composition and a sheet 11 of a rubber composition containing no blowing ingredient but preferably containing a lubricating material such as graphite are formed and plied together by calendering, strips such as the strip 12 are cut from the composite sheet, and each strip is folded to the channel form shown in Fig. 2, with the sponge-rubber composition in the interior of the structure, and is stuck to a base strip 13 as there shown.

A number of the composite channel strips are then mounted in a mold or vulcanizing pan 14, Fig. 3, and are vulcanized therein, preferably in open steam or air, and during the cure the sponge-rubber composition swells, becoming cellular and causing the strip to take the form of the mold cavity in which it is vulcanized, and the three elements of the strip are strongly united by the vulcanization, providing a finished channel strip such as that shown in Fig. 4.

A product of good appearance and light in weight and having the other advantages pointed out in the above statement of objects is thus obtained.

Desirable color effects may be obtained by employing suitable coloring ingredients in the surface sheet 11.

I claim:

1. A channel strip comprising a surface layer of dense soft rubber and an internal portion of cellular soft rubber, the two being of different composition and united by vulcanization.

2. A channel strip comprising a soft sponge rubber body and a surface layer united therewith by vulcanization and consisting of a dense soft rubber composition containing a lubricating material.

In witness whereof I have hereunto set my hand this 26th day of April, 1929.

ELIAS E. DAVIDSON.